June 14, 1960
B. I. ULINSKI
2,940,626
FORK MOUNTING CONSTRUCTION
Filed Oct. 24, 1957
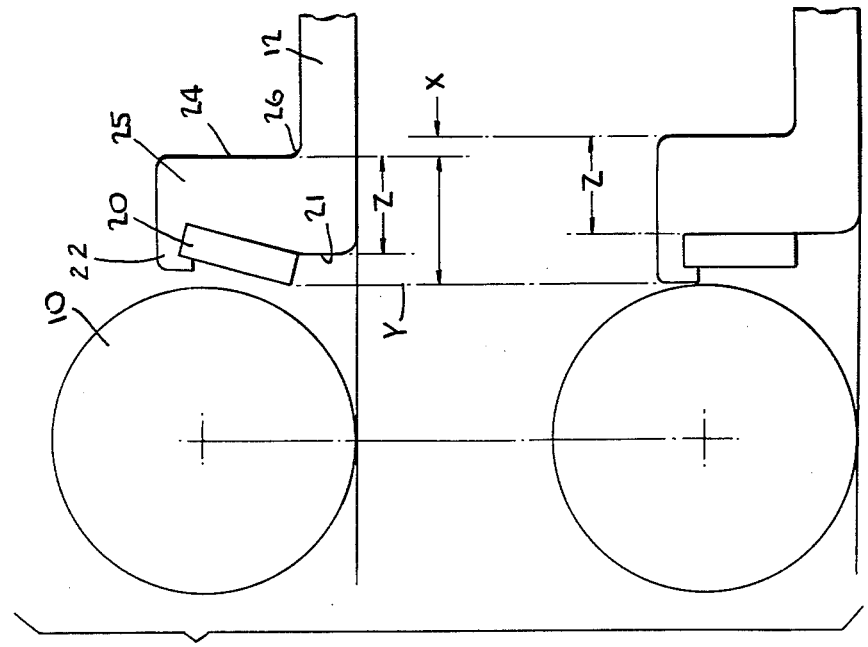
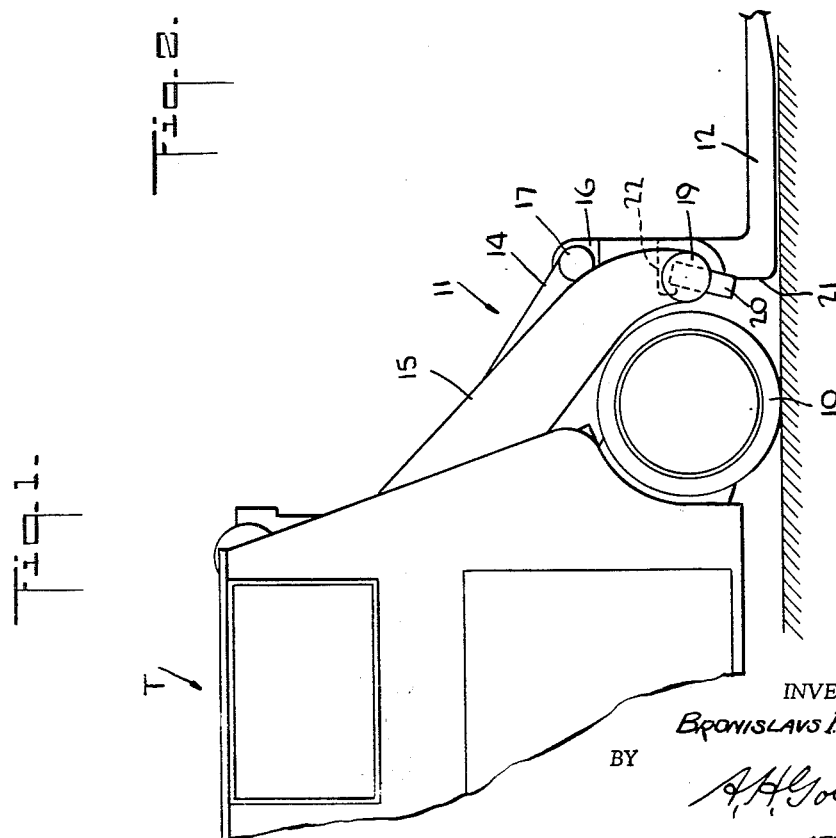
INVENTOR.
BRONISLAVS I. ULINSKI
BY
A. H. Golden
ATTORNEY

United States Patent Office 2,940,626
Patented June 14, 1960

2,940,626
FORK MOUNTING CONSTRUCTION

Bronislaus I. Ulinski, Flossmoor, Ill., assignor to The Yale and Towne Manufacturing Company, Stamford, Conn., a corporation of Connecticut Filed Oct. 24, 1957, Ser. No. 692,067

2 Claims. (Cl. 214—750)

This invention relates to industrial trucks, and more particularly, to an improvement in the mounting of the load platform or load forks of industrial trucks.

More particularly, my invention relates to the mounting of a load platform or load forks on a vertical lifting bracket that forms the basic lifting portion of an industrial truck. Today, this bracket is generally in the form of a steel plate and the forks or platform adapted to coact with this steel plate have portions that rest on the upper horizontal edge of the steel plate. Actually, these portions of the platform or forks may be in the form of hooks having parts that coact with the back surface of the vertical plate. Frequently, the vertical plate is castellated and the forks or platform are equipped with portions lying in the castellations.

For further supporting the forks or platform on the plate, the forks or platform have surfaces lying against the plate. These surfaces may be formed relatively to the plate so as to be co-extensive therewith or the plate may have an outwardly curved portion to coact with complementary surfaces on the forks or platform. Those skilled in the art will recognize that the construction I have described generally is rather universal.

It will be recognized also, by those skilled in the art, that the vertical plate must be positioned forwardly of the front wheels of the truck if the load platform or forks are to be lowered to the ground or floor. This means that the entire load, because of its location forward of the wheels, will exert a tendency to tip the truck forwardly about the front wheels as a fulcrum. Because of this relationship of the parts, it becomes extremely important to move the center of gravity of the load resting on the forks or platform as close to the forward wheels as is possible.

To illustrate the extremely critical nature of the present problem, consider a truck having its center of gravity five feet behind the axis of rotation of the front wheels. Such a truck, carrying a 30,000 pound load requires 500 pounds of counterbalancing truck weight for each one inch between the axis of rotation of the front wheels and the center of gravity of the load. In other words, it will be possible to save 500 pounds of counterweight for each inch that the center of gravity of the load can be brought closer to the axis of rotation of the wheels. Of course, the problem of moving the load as closely to the forward wheels as possible is further complicated by the fact that the forks must have considerable strength, particularly where the forks turn from a vertical to a horizontal portion. In the parlance of the industry, this is known as the bend of the forks.

I have conceived by my invention a novel construction that enables me to mount an L-shaped load platform on the platform supporting bracket of an industrial truck in a manner to position the platform, and consequently any load carried on the platform, closer to the axis of rotation of the front wheels of the truck than has been possible heretofore in trucks of the foregoing class.

In essence, my invention resides in positioning the fork or platform supporting bracket or plate so that it lies in a forward tilted, angular position relatively to the vertical while the forward surface of the vertical leg of the load platform or forks is vertical.

As a feature of the invention, and, in order to maintain sufficient strength at the bend of the forks, as well as to hold the vertical leg of the load fork or platform vertical, I shape the rear surface of the L-shaped fork or platform, together with the hook, so as to accommodate it to the angularity of the bracket.

In the execution of this novel concept in practice, the forward surface of the vertical leg of the fork or platform is positioned rearwardly of its position in conventional structures. At the same time, the critical dimension of the fork between the forward and rear surfaces of the vertical leg at the level of the bend is maintained equal or greater than that of the same dimension in a conventional structure.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

An illustrative embodiment of the invention has been chosen for purposes of illustration and description, and is shown in the accompanying drawing forming a part of this specification.

In the drawing:

Fig. 1 is a fragmentary side elevational view illustrating the front portion of an industrial truck employing the present invention; and Fig. 2 is a schematic view comparatively illustrating the present invention superimposed over a conventional construction.

Referring to Fig. 1, there is shown an industrial truck T having a pair of front wheels 10 and a parallelogram leverage system 11 for lifting an L-shaped fork or load platform 12.

The leverage system 11 includes a first pair of upper arms 14 and a pair of lower arms 15, and a pair of substantially vertical arms 16 (only one of each pair of arms being shown). The arms 16 are pivoted at 17 to the upper arms 14, and at 19 to the lower arms 15. A transverse fork supporting bracket 20 is carried by the arms 16 and is disposed in a forward, tilted, angular position relatively to the vertical. While I have chosen to illustrate my novel concept utilized in connection with a leverage system for elevating the load platform, it is important to understand that my invention may be readily employed in industrial trucks equipped with uprights for guiding the elevation of the fork or platform.

The load platform 12 is an L-shaped fork having a portion of its rear surface 21 resting against the bracket and formed with a hook 22 fitting over the top of the bracket 20.

As shown in Fig. 2, my present concept enables me to position the load platform closer to the center of rotation of the wheels 10 than has been possible in conventional constructions. After positioning the fork supporting bracket 20 as described, I shape the rear surface of the fork together with the hook to accommodate the angularity of the bracket 20, thus positioning the forward surface 24 of the vertical leg 25 of the fork rearwardly of its conventional position in a structure by a distance indicated by the reference letter X. It is important to note that in the utilization of my novel concept, the forward surface of the vertical leg of the fork is moved rearwardly while at the same time the bracket and fork assembly itself is maintained the same distance from the center of rotation of the wheel 10 as in the conventional construction, as indicated by the line Y. Moreover, it is equally important to note that in effecting the rearward positioning of the front surface 24 of the fork 25, the critical dimension Z of the fork between the rear and forward surfaces of the vertical leg 25 at the level of the bend 26 of the fork, is maintained equal to the critical dimension of a conventional structure.

From the foregoing description, it will be seen that by employment of my novel construction in practice, the load carried on the load platform may be positioned closer to the axis of rotation of the front wheels 10 of the truck, so that a considerable saving of counterweight may be effected in the construction of the truck.

I believe that the construction and operation of my novel fork mount will now be understood, and that the advantages of my invention will be fully appreciated by those persons skilled in the art.

I claim:

1. In a lift truck of the class having a fork support bracket mounted for lifting movement relatively to a lowered position on the truck, said bracket in lowered position extending in front of the forward wheels of the truck with a lower part of the bracket below an upper part of said wheels, and an L-shaped fork having critical dimensions at the level of its bend between the rear and forward surfaces of its vertical leg, the said fork leg having a portion of its rear surface resting against the lower part of the bracket in front of the wheels, and support means engaged with the top of the bracket to support the fork, the improvement that comprises said bracket so positioned that it lies in a forward tilted angular position relatively to the vertical when the forward surface of the vertical leg of the work is vertical, the lower part of said bracket being placed rearwardly relatively to the top of the bracket so that said lower part while extending in front of said wheels will lie closer to the axis of rotation of the wheels than in a conventional truck, and the rear surface of the fork leg together with the support means being shaped to accommodate the rear surface of the fork and the support means to the angularity of the bracket so that the rear fork surface rests against said rearwardly placed lower part of the bracket, whereby to enable the fork to be positioned entirely forwardly from the truck wheels for vertical movement with the bracket while the forward surface of the vertical leg of the fork is rearwardly of its position in a conventional structure, and while maintaining equal to that of a conventional structure the critical dimensions of the fork between the rear and forward surfaces of the vertical leg at the level of the bend.

2. In a lift truck of the class having a fork support bracket mounted for lifting movement relatively to a lowered position on the truck, said bracket in lowered position extending in front of the forward wheels of the truck with a lower part of the bracket below an upper part of said wheels, and an L-shaped fork having critical dimensions at the level of its bend between the rear and forward surfaces of its vertical leg, the said fork leg having a portion of its rear surface resting against the lower part of the bracket in front of the wheels, and support means engaged with the top of the bracket to support the fork, the improvement that comprises said bracket so positioned that it lies in a forward tilted angular position relatively to the vertical when the forward surface of the vertical leg of the fork is vertical, the lower part of said bracket being placed rearwardly relatively to the top of the bracket so that said lower part while extending in front of said wheels will lie closer to the axis of rotation of the wheels than in a conventional truck, and said vertical fork leg being tapered to accommodate the rear surface of the fork and the support means to the angularity of the bracket, with a part of said rear fork surface which is substantially above the level of the bend resting against said rearwardly placed lower part of the bracket, whereby to maintain equal to that of a conventional structure the critical dimensions of the fork between the rear and forward surfaces of the vertical leg at the level of the bend, when the forward surface of the vertical fork leg is placed rearwardly of its position in a conventional structure, with the fork adapted to move with the bracket relatively to lowered position in front of the truck wheels.

References Cited in the file of this patent

UNITED STATES PATENTS

| | | |
|---|---|---|
| 2,305,578 | Ulinski | Dec. 15, 1942 |
| 2,545,417 | Ulinski | Mar. 13, 1951 |